(12) United States Patent
Mukherjee et al.

(10) Patent No.: US 11,164,575 B2
(45) Date of Patent: Nov. 2, 2021

(54) METHODS AND SYSTEMS FOR MANAGING VOICE RESPONSE SYSTEMS TO OPTIMIZE RESPONSES

(71) Applicant: INTERNATIONAL BUSINESS MACHINES CORPORATION, Armonk, NY (US)

(72) Inventors: Maharaj Mukherjee, Poughkeepsie, NY (US); Shikhar Kwatra, Durham, NC (US); Jeremy Fox, Georgetown, TX (US); Sarbajit Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 16/240,312

(22) Filed: Jan. 4, 2019

(65) Prior Publication Data

US 2020/0219498 A1    Jul. 9, 2020

(51) Int. Cl.
*G10L 15/22* (2006.01)
*G06N 20/00* (2019.01)
*G06F 3/16* (2006.01)

(52) U.S. Cl.
CPC .............. *G10L 15/22* (2013.01); *G06F 3/167* (2013.01); *G06N 20/00* (2019.01); *G10L 2015/223* (2013.01)

(58) Field of Classification Search
None
See application file for complete search history.

(56) References Cited

U.S. PATENT DOCUMENTS

| | | |
|---|---|---|
| 10,565,985 B1 * | 2/2020 | Huang .................... G10L 15/18 |
| 2014/0074483 A1 | 3/2014 | Van Os |
| 2015/0162000 A1 | 6/2015 | Di Censo et al. |
| 2016/0352657 A1 | 12/2016 | Galley et al. |
| 2017/0213007 A1 * | 7/2017 | Moturu ................. G16H 40/20 |
| 2018/0018373 A1 | 1/2018 | Yazdian et al. |
| 2018/0121432 A1 * | 5/2018 | Parson ................. G06F 16/639 |
| 2018/0240459 A1 * | 8/2018 | Weng ..................... G10L 15/22 |
| 2019/0349213 A1 * | 11/2019 | Shive .................... G06N 5/025 |

* cited by examiner

*Primary Examiner* — Quynh H Nguyen
(74) *Attorney, Agent, or Firm* — Griffiths & Seaton PLLC

(57) ABSTRACT

Embodiments for managing a voice response system by one or more processors are described. A communication is received from an individual. A response to the received communication is determined based on at least one data source associated with the individual. The determined response is caused to be executed by a computing device.

15 Claims, 6 Drawing Sheets

METHODS AND SYSTEMS FOR MANAGING VOICE RESPONSE SYSTEMS TO OPTIMIZE RESPONSES

BACKGROUND OF THE INVENTION

Field of the Invention

The present invention relates in general to computing systems, and more particularly, to various embodiments for managing voice response systems based on, for example, the context of received communications and/or user preferences to optimize responses.

Description of the Related Art

Voice response systems, also known as chatbots, talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions and provide commands, and the chatbot may respond (e.g., answer a question, perform an action, etc.) based on its knowledge base and/or by analyzing the question/command, providing the best response it can generate.

However, chatbots do not generally take into consideration data specific to the user, such as related to the context in which the voice communication is provided and/or preferences specific to the user. More specifically, although current systems may be able to appropriately respond to clear, definitive questions or commands, they often are unable to respond to (and/or process) statements or assertions made by the user.

SUMMARY OF THE INVENTION

Various embodiments for managing voice response systems by one or more processors are described. In one embodiment, by way of example only, a method for managing a voice response system, again by one or more processors, is provided. A communication is received from an individual. A response to the received communication is determined based on at least one data source associated with the individual. The determined response is caused to be executed by a computing device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
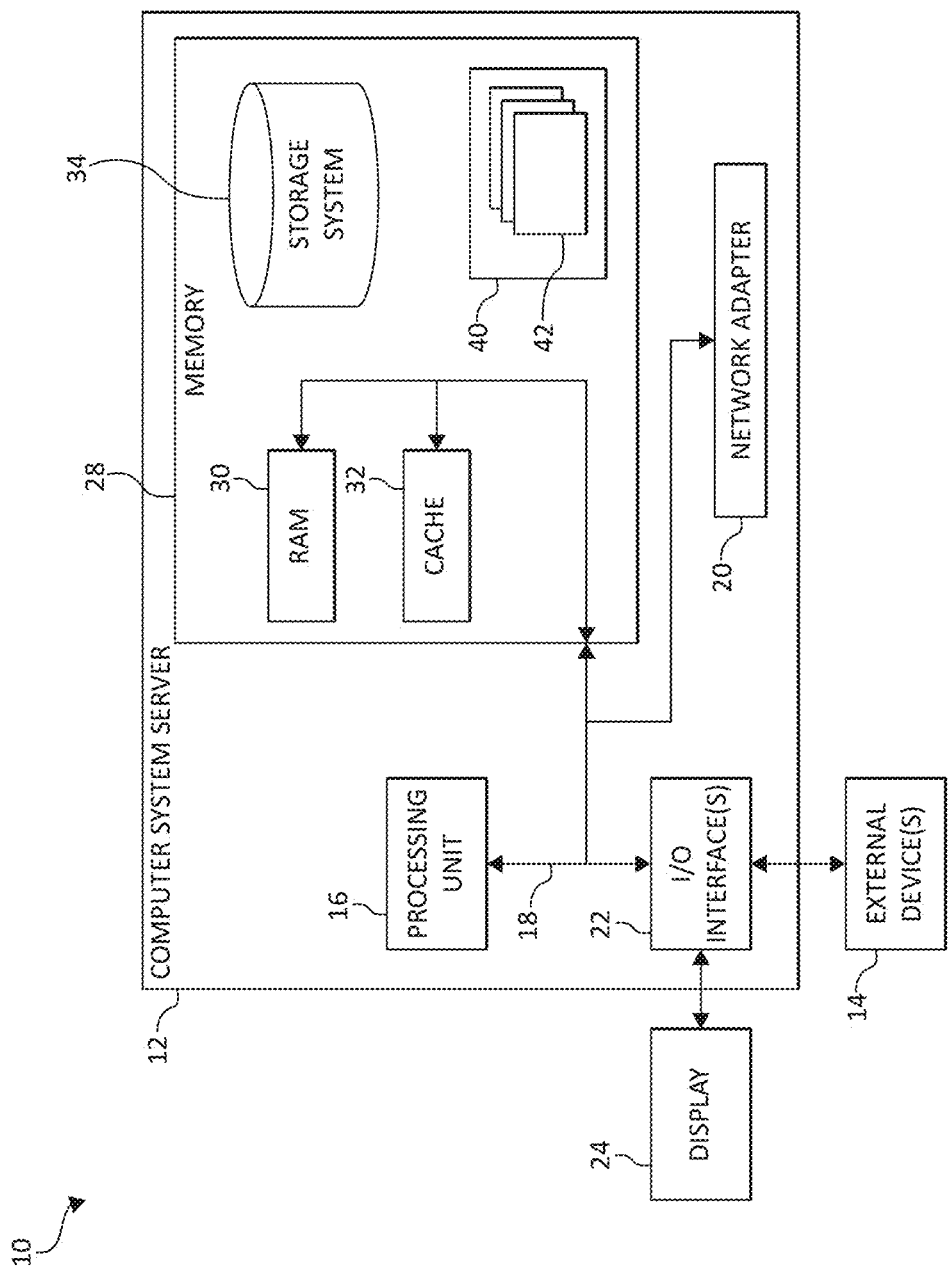
FIG. 1 is a block diagram depicting an exemplary computing node according to an embodiment of the present invention.

As discussed above, voice response systems, also known as chatbots, talkbots, chatterbots, bots, instant messaging (IM) bots, interactive agents, Artificial Conversational Entities (ACEs), etc., are computer nodes (i.e., devices and/or programs) or artificial intelligence modules which are able to conduct conversations with individuals (or users) through auditory (e.g., speech/voice) or text-based methods. Such programs are often designed to convincingly simulate how humans behave as conversational partners. As such, users may ask questions and provide commands, and the chatbot may respond (e.g., answer a question, perform an action, etc.) based on its knowledge base and/or by analyzing the question/command, providing the best response it can generate.

For example, if the user asks the chatbot what the current price is for a particular stock, the chatbot may be easily able to find the appropriate information from an online source and generate an appropriate auditory response. Similarly, if the user provides the chatbot with a command to play a particular piece of music or album, the chatbot may be easily able to access the music and cause it to be rendered by an appropriate sound system.

However, chatbots do not generally take into consideration data specific to the user, such as related to the context in which the voice command is provided and/or preferences specific to the user providing the command. More specifically, although current systems may be able to appropriately respond to clear, definitive questions or commands, they often are unable to respond to (and/or process) statements or assertions made by the user. In this way, current chatbot systems are not able to respond in the exact way a human assistant or companion would to some communications, as humans are often able to interpret or understand statements (or assertions) in a "natural" or "intuitive" manner.

For example, current chatbot systems may not be able to provide appropriate responses to statements such as "I am tired" or "I am hungry," while humans may intuitively be able to provide recommendations to such communications. As such, when compared to current chatbot systems, humans may be better at responding when the communication provided by the user is not provided in an explicit question or command form.

Thus, there is a need for methods and systems for managing chatbot (or voice response) systems that, for example, utilize knowledge of the context in which communications are received and/or various types of data associated with the user providing the communication (or some other user associated with the communication), such as a user profile, user interests, user preferences, etc.

To address these needs, some embodiments described herein provide methods and systems for managing (or controlling) chatbots (or chatbot systems) with the ability to understand communications (e.g., voice communications and/or text-based communications) and generate customized responses (e.g., voice replies, actions, etc.) based on various data sources and/or computing devices (or nodes) associated with the user providing the communication (or another individual associated with the communication).

As such, in some embodiments, the methods and systems described herein are capable of, for example, dynamically understanding and correlating the cognitive state of the user with the contextual situation in order to provide an optimal set of responses including a conglomeration of verbal and non-verbal cues for the user (or group of user or another individual).

For example, in some embodiments, if the communication (e.g., voice communication) "I am sleepy" is received (or detected), the system may generate an auditory response, such as "Shall I turn off the lights so that you can go to sleep?" (e.g., if the user is at their home). Such a response may be based on, for example, whether or not the user typically turns off the lights, which lights they usually turn off, and/or which lights are dimmed/turned down when they go to sleep (or to bed). As such, the response generated by the system may include several tasks (e.g., generating the auditory response and taking the appropriate action if the user indicates that they want the suggested action taken). In such a case, the auditory response generated by the system may be the same regardless of the specific action taken (e.g., whether the system turns off or dims all lights or just some of the lights).

As another example using the same voice communication (e.g., "I am sleepy"), the system may generate an auditory response, such as "Shall I play some light classical music for you?" Such a response may be based on, for example, whether or not the user typically listens to music and/or what kind of music they listen to when they go to sleep. Additionally, the order in which the music is played when the user is in bed may be different than at other times and/or the volume may be set relatively low (or may be gradually decreased over time after the user lies down). Again, in such an instance, the system's response may include several tasks (e.g., generating the auditory response, which may be same regardless of the specific action taken, and taking the appropriate action if indicated by the user).

As another example using the same voice communication (e.g., "I am sleepy"), the system may generate an auditory response, such as "Shall I set up the alarm so that you can get up early next morning?" Such a response may be based on the context in which the voice communication is provided. For example, if the user's schedule or calendar indicates that they have to be at work and/or have a meeting the next morning (and the alarm has not been set), the system may respond in such a manner. If the user indicates that they want the alarm to be set up (e.g., via a voice reply), the system may do so based on the user's preferences and/or previous usage of the alarm (e.g., buzzing sound vs. music, type of music, volume, etc.). Again, in such an instance, the system's response may include several tasks, and the auditory response generated by the system may be the same regardless of specific actions taken (e.g., whether or not the alarm is set up, buzzing sound vs. music, etc.).

As a further example using the same voice communication (e.g., "I am sleepy"), the system may generate an auditory response, such as "You must be joking. It is 7 A.M., and you need to be at work in an hour." Again, such a response may be based on the context in which the voice communication is provided. That is, if the voice communication is received on, for example, a weekday morning, and the system determines that the user needs to go to work (or at least typically goes to work) on such mornings, the system may respond in such a manner. However, if the system determines an unusual context (e.g., the user returned home from a business trip on a very late flight the night before), a different response may be generated (e.g., suggesting that the user send an email to their employee to remind them of the business trip).

Now consider a scenario in which the user provides a voice communication indicating that they are hungry (e.g., "I am hungry"). In some embodiments, exemplary auditory responses generated by the system may include, for example, asking the user whether or not the user would like the system to order pizza, informing the user where the nearest pizza place is, and/or informing the user that they recently ate. Each of these responses may be generated depending on the context in which the voice communication is provided. For example, if the user is determined to be at home, and frequently orders pizza from a particular, nearby pizza place, the first response may be generated (combined with the appropriate action if indicted by the user). If the user is determined to be driving on a highway, the system may determine how long it will take to get to the nearest pizza place and generate the second response. If the user's preference's (and/or other data sources associated with the user) indicate that the user is trying to control their caloric intake, the third response may be generated (e.g., if the system determines that the user recently ate and/or was at a restaurant).

In some embodiments, when the system is unsure what responses (e.g., auditory response and/or actions) should be generated, the system may ask the user questions and/or offer suggestions regarding possible responses and/or actions that may be performed by the user and/or the system, again depending on the context, previous interactions with the system, user preferences, etc. For example, if the user provides a voice communication indicating that they are bored (e.g., "I am bored"), the system may generate an auditory response that includes asking the user if they would like to take the system (e.g., being utilized through a mobile electronic device) to a movie, suggest that the user watch a television program with the system, and/or suggest playing some music for the user. As another example, if the user indicates that they are scared (e.g., "I am scared"), the system may suggest reading a story to the user and/or inquire if the user would like to talk to one of their parents (e.g., via initiating a phone call). In this sense, in some embodiments, the methods and system described herein may be able to more closely mimic the behavior of a human companion compared to current chatbot systems.

In some embodiments, the system is configured to utilize predefined (or factor default) responses (i.e., preset responses that may be generated/executed in response to receiving/detecting particular commands). Over time, perhaps utilizing feedback from the user(s), the system may tailor and/or adjust operation to accommodate for particular users (e.g., via machine learning). As such, the system may learn what responses are suitable for (or preferred by) particular users, such as when providing particular commands, perhaps in particular situations.

In some embodiments, the data source(s) utilized may include, for example, any available data sources (perhaps utilized by and/or stored on computing devices) associated with the user (i.e., the individual providing the communication) and/or other individuals associated with the communication (e.g., individuals referenced by the communication). For example, in some embodiments, a profile (e.g., a cognitive profile) for the user(s) (i.e., the user providing the command and/or other individuals) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, use preferences, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, some of the data utilized is detected by sensors, such as cameras, microphones, biometric sensors, motion sensors, and wireless transceivers (e.g., wireless communications to detect the presence of computing devices), which may be integrated into a computing device associated with the chatbot system (e.g., a mobile phone) or another computing device (e.g., a wearable device, such as a smart watch) and/or separate from such devices (e.g., security cameras).

In some embodiments, the methods and systems described herein utilize a cognitive analysis that is performed on the available data sources. The cognitive analysis may also include classifying natural language, analyzing tone, and analyzing sentiment (e.g., scanning for keywords, key phrases, etc.) with respect to, for example, communications sent to and/or received/detected by chatbots and/or available data sources. In some embodiments, natural language processing (NLP), Mel-frequency cepstral coefficients (MFCCs), and/or region-based convolutional neural network (R-CNN) pixel mapping (e.g., for images/videos sent to or utilized by chatbots), as are commonly understood, are used. Over time, the methods and systems described herein may determine correlations (or insights) between communications (e.g., voice and/or text-based communications) received by chatbots and responses generated by chatbots, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of chatbot operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing a voice response system by one or more processors is provided. A communication is received from an individual. A response to the received communication is determined based on at least one data source associated with the individual. A signal representative of the determined response may be generated. The determined response is caused to be executed by a computing device.

The determined response may include an auditory response, and the causing of the determined response to be executed by the computing device may include causing the auditory response to be rendered by a speaker. The determined response may include an action performed by a computing device, and the causing of the determined response to be executed by the computing device.

The determining of the response to the received communication may be performed utilizing a cognitive analysis. The at least one data source associated with the individual may include at least one of electronic communications, social media activity, and a schedule. The at least one data source may include data collected by at least one sensor.

Feedback may be received from the individual after the causing of the determined response to be executed by the computing device. A second communication may be received from the individual. A second response to the second communication may be determined based on the at least one data source associated with the individual and the received feedback.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a chatbot and/or in/through which a chatbot (or voice response system) may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
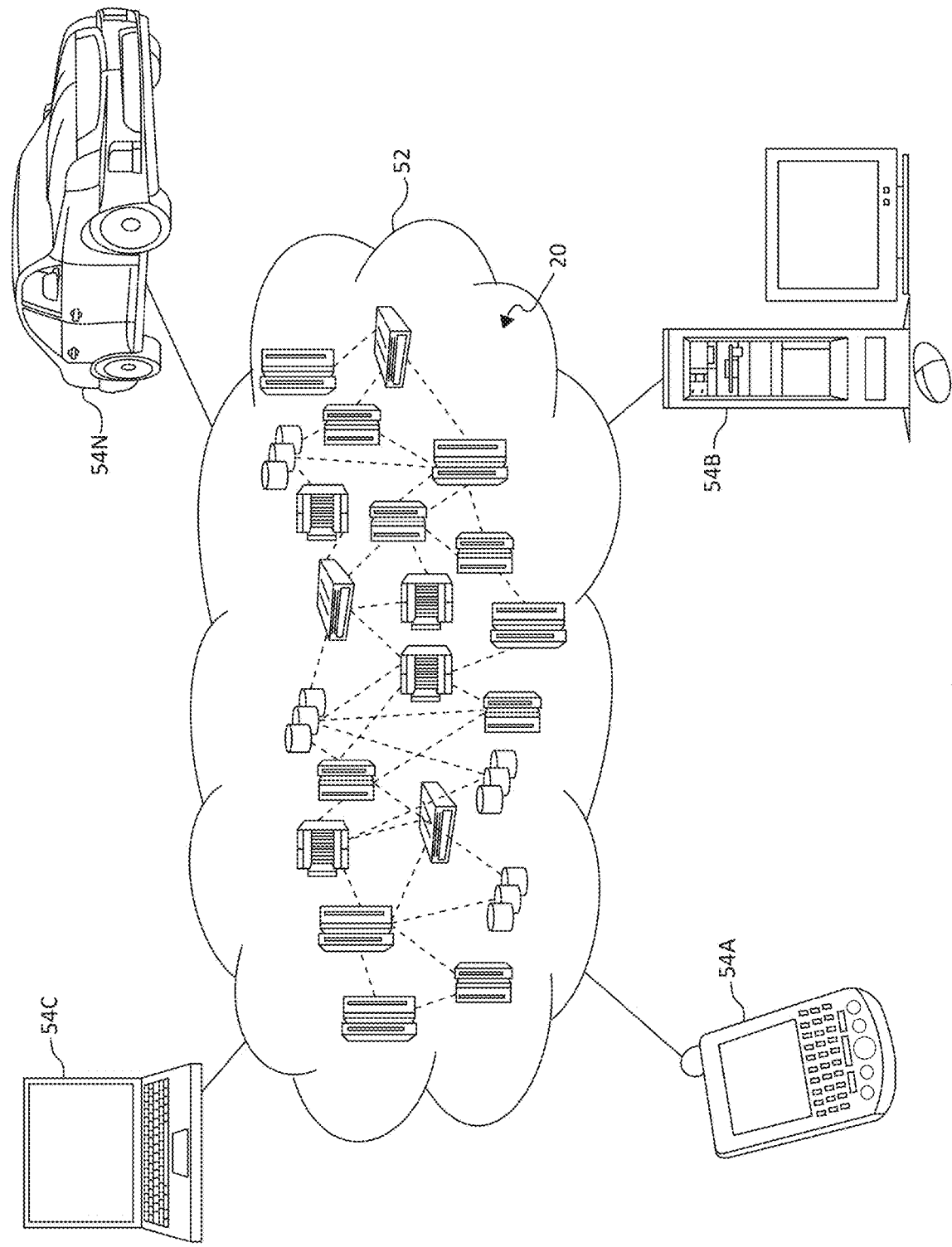
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
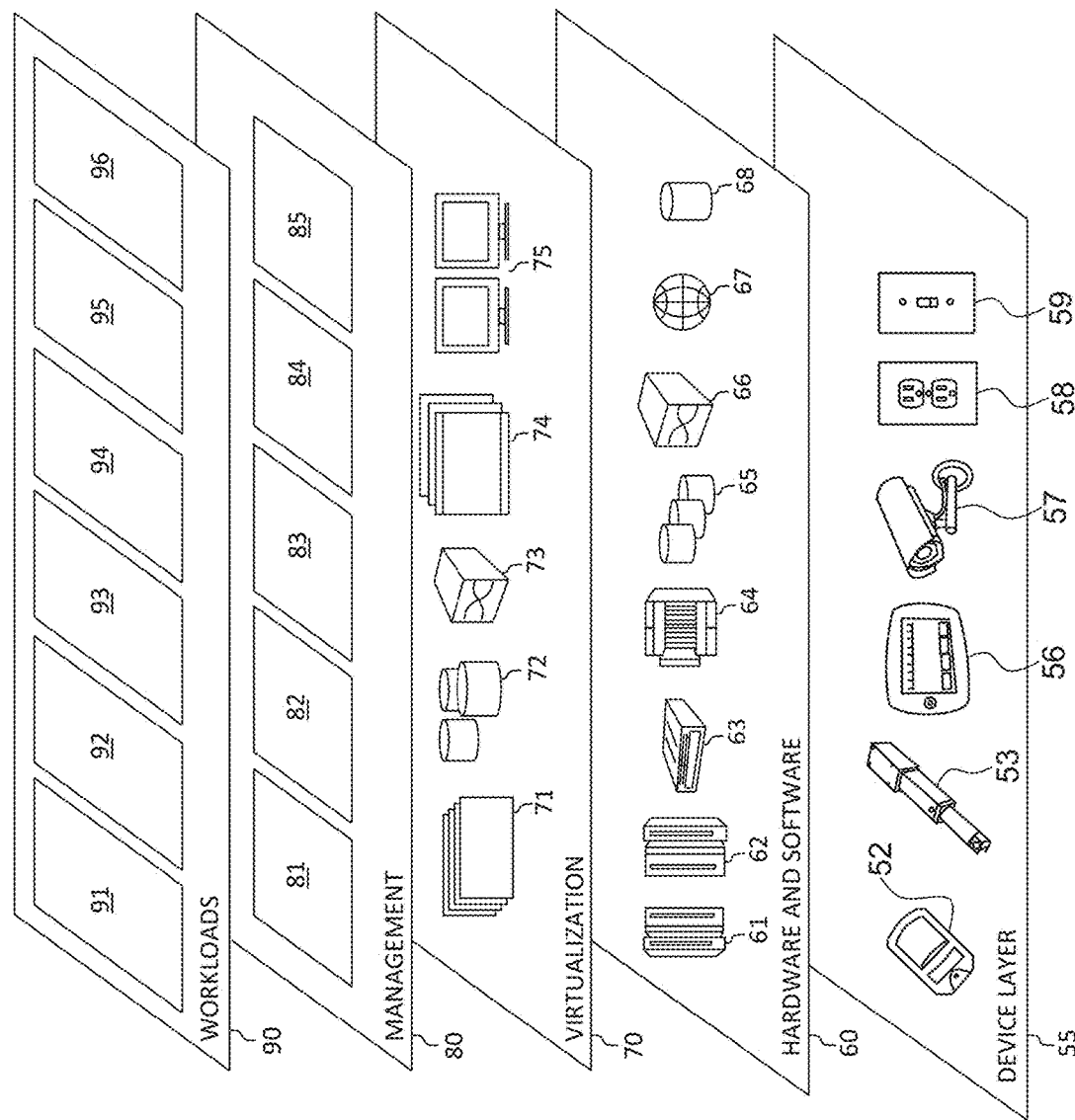
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing chatbots (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and systems are provided that, for example, manage (or control) chatbots (or chatbot systems or voice response systems) in such a way as to understand voice communications (or text-based communications) and generate customized responses (e.g., voice replies/responses, actions, etc.) based on various data sources associated with the user providing the communication (or another individual associated with the communication). As such, in some embodiments, the methods and systems described herein are capable of, for example, dynamically understanding and correlating the cognitive state of the user with the contextual situation in order to provide an optimal set of responses including a conglomeration of verbal and non-verbal cues for the user (or group of user or another individual).

In some embodiments, the chatbot (or a computing device associated with the chatbot) monitors or collects data from any available data sources and/or computing devices associated with the user. Examples include the various data sources described above and the user's mobile devices (e.g., mobile phones, wearable devices, laptop computers, etc.). Various types of machine-to-machine communications may be utilized, such as Message Queuing Telemetry Transport (MQTT), ad-hoc networks, near field communications, or other wireless communication protocols.

In some embodiments, the operation of the chatbot system is performed utilizing a contextual situation analysis. For example, the system may collect and/or monitor audio and visual information from various sources, such as cameras, microphones, mood capturing units (e.g., utilizing cameras, microphones, biometric sensors, etc.), via, for example, wireless communications. The contextual situation and environmental conditions of the user may be determined to dynamically configure system (or user) preferences and/or otherwise perform the functionality described herein. In some embodiments, the input parameters that are utilized by the system in order to understand the cognitive state of the user with respect to the chatbot operation (and/or the operation of any computing nodes) may include, for example, the user's mood and cognitive state (e.g., monitored/determined via wearable devices, cameras, etc.), the time of the day (e.g., temporal metric), the user's schedule/calendar (and/or events/items listed thereon), conversations (e.g., conversation monitoring via a long short-term memory (LSTM) module or model), and geo-spatial metrics (e.g., the user's location determined via GPS or otherwise).

In some embodiments, the system utilizes a temporal buffering module or functionality. For example, the computing device utilized may include a LSTM module that is capable of buffering a sequence of commands (or communications). NLP may be utilized for semantic and syntactic information processing to understand the user's communications (e.g., commands, questions or queries, statements, assertions, etc.) and reactions (e.g., moods). A timestamp and geo-spatial metrics may be associated with the communications.

In some embodiments, the system utilizes an iterative contextual correlation module. For example, output captured from the LSTM module, which includes buffered spoken words received from the user, may be utilized as input features for an iterative reinforcement machine learning model, as is commonly understood. Other input features may include geo-spatial metrics, temporal metrics, and the user's activity, which may be utilized by the system to determine a response (e.g., auditory response and/or action performed by a computing device or IoT device) generated by the system.

In some embodiments, the system utilizes iterative learning feedback. For example, after the response has been generated, a feedback learning component of a recurrent neural network (RNN) model utilized monitors the cognitive heuristics (and/or any available data source associated with the user) for a configurable time period (T) in order to understand the user's mood, satisfaction level, etc. associated with the response. Any correlations that are determined may be used to prioritize (or score, grade, etc.) the response. As such, in some embodiments, as part of iterative learning feedback, historical pattern analysis is considered in conjunction with real-time metrics (and/or data sources), as described above.

In some embodiments, an algorithmic approach utilized by the system may include the following steps, which may be performed for each user ($U_i$) in the current list of users (U) for the system. Characteristics for the user ($U_i$) may be collected (or retrieved or monitored), such as tone (t), language expression (l), facial gestures (f), and body gestures/actions (b) l, g, b)). The user characteristics are analyzed to determine a cognitive state (cs) and/or behavior (be)

(and/or geo-spatial temporal metrics) of the user ($U_i$(cs, be)). If the cognitive state and/or behavior of the user are maintained for a duration that exceeds an initial threshold (t_w), a monitoring session is started for the user (and/or other users/individuals associated with, nearby, etc. the user).

For each history record of the user ($U_i\_H_i$) in the set of history records for the user ($U_i\_H$), if the history record contains an old user cognitive state behavior and geo-spatial temporal metrics that triggered feedback to the system that is similar to the current state of the user, a cluster monitoring session is started for the user (and/or other users/individuals associated with, nearby, etc. the user).

The characteristics of the user (and/or others) ($U_i$(t, l, g, b)) is continuously monitored, and the configuration of the response(s) is changed accordingly. The user's (or users') reactions to the changes (and/or responses) are monitored or measured.

Each clustering action (or generated response) ($P\_A_i$) includes a set of machine comprehensible actions, a duration, a prioritization of response, and a set of user cognitive states and behaviors ($U_x$(cs, be)) for which the clustering action is recommended. The prioritization of the clustering actions is used to set the order of clustering actions to minimize affectation of the user. A clustering action is selected based on the current user cognitive state and behavior and priority ($P\_A_i\_p$). After execution, the monitoring session continues.

If the user's cognitive state and behavior drops below a particular threshold for a configurable amount of time, the monitoring session is completed. The session is saved in user history ($U_i\_H$), such as on a database (e.g., on the cloud), for future reference.

Figure 4:
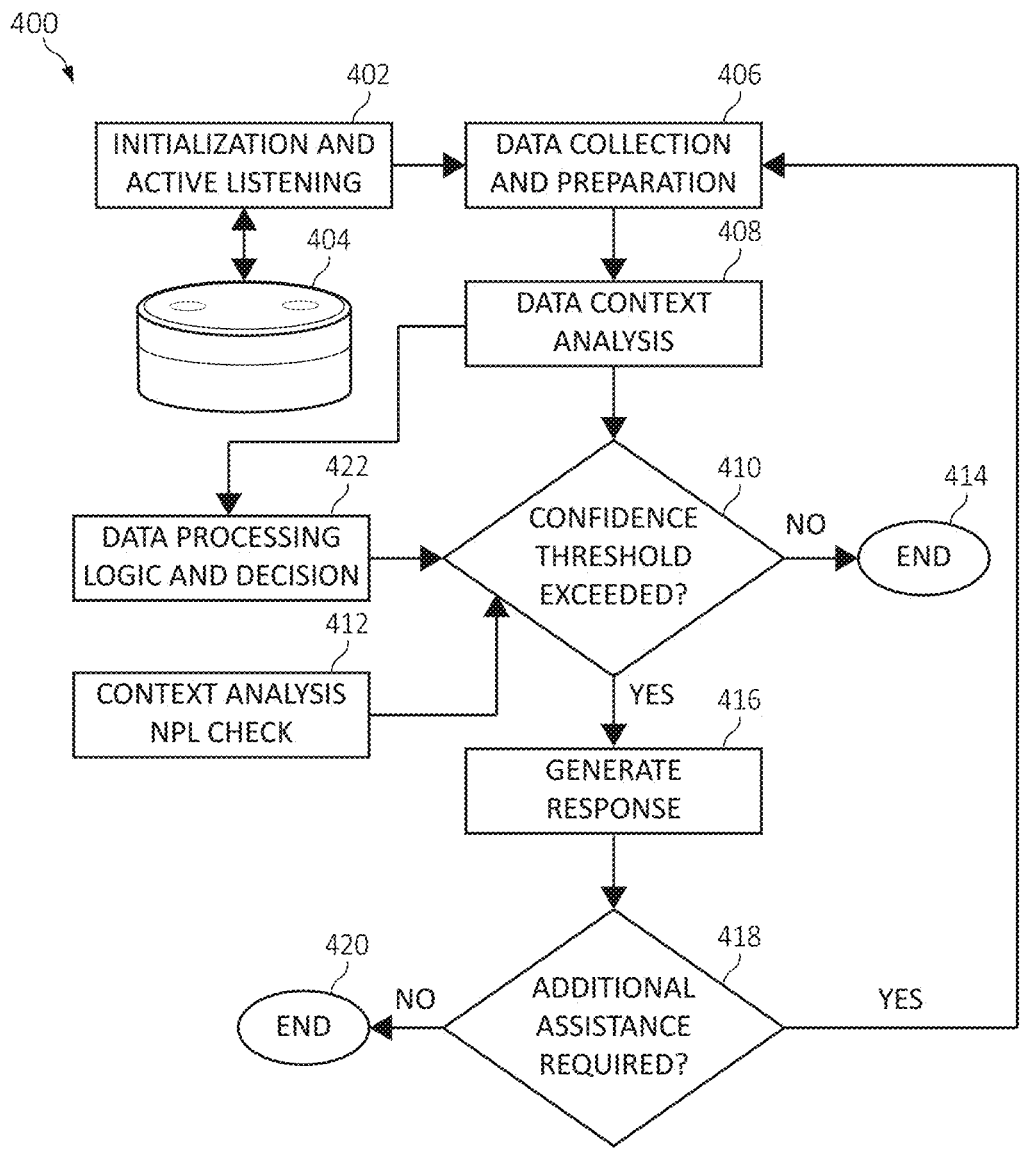
FIG. 4 is a block diagram/flow chart of a system and/or method for managing voice response systems according to an embodiment of the present invention.

FIG. 4 illustrates a block diagram of a system (and/or method) 400 for managing a chatbot (or voice response system) according to an embodiment of the present invention. As described above, the system 400 may be implemented utilizing one or more computing devices (or nodes) and/or a cognitive analysis (or module). At block 402, the system is initialized and active (and/or continuous) listening (and/or receiving voice and/or text-based communications) is performed, which may be performed utilizing a chatbot device 404. The chatbot device 404 may be any suitable computing node through which a user may interact with a chatbot (or voice response system), such as a stand alone/dedicated chatbot device, a mobile electronic device (e.g., a mobile phone, tablet device, laptop computer, etc.), a desktop PC, a vehicular computing system, etc.

At block 406, data collection and preparation is performed. The data collection may include collecting (and/or monitoring) data from any data source associated with the user (and/or another individual), such as those described above. The data preparation may include, for example, categorizing the data and/or converting unstructured data into structured data. At block 408, data context (or contextual) analysis is performed (e.g., to determine the cognitive state, context, behavior, etc. of the user), as described above. At block 422, data processing is performed and a decision regarding the response to be generated is performed (e.g., a response to a received communication is determined).

At block 410, the system determines whether or not a confidence (or confidence score or grade) score associated with the determined response (and/or the understanding of the received communication and/or the user's contextual situation, behavior, etc.) exceeds (or meets) a threshold (e.g., a configurable threshold). At block 412, NLP may be utilized to check (or re-check) or (re)analyze the available data (e.g., the received communication, the data sources, etc.) to, for example, determine (or calculate) the confidence (or confidence score/grade). The confidence may be determined or calculated as a score (e.g., a positive or negative integer or decimal on any scale) or a grade (e.g., "low," "medium," "high," etc.). If the threshold is not exceeded, at block 414, the system (or method) 400 may stop/end (and/or return to block 402 and/or 406).

If the threshold is exceeded (or met), at block 416, the determined response is generated. As discussed above, the response may include rendering an auditory response and/or performing an action (e.g., via a computing device, IoT device, etc.). At block 418, the system determines whether or not the user requires additional assistance and/or whether or not any additional steps are required to complete the response. For example, if the generated response includes an auditory response that poses a question to the user (e.g., asking if the user would like to listen to some music), the additional assistance may include completing the task (e.g., causing music to begin to be played) if the user indicates such. Alternatively, the users may reply to the response with a subsequent communication, which may call for an additional response from the system. If additional assistance is determined to be required, the system (or method) 400 may return to block 406. If no additional assistance is determined to be required, the system 400 may stop/end at block 420 (and/or return to block 402 and/or 406).

Figure 5:
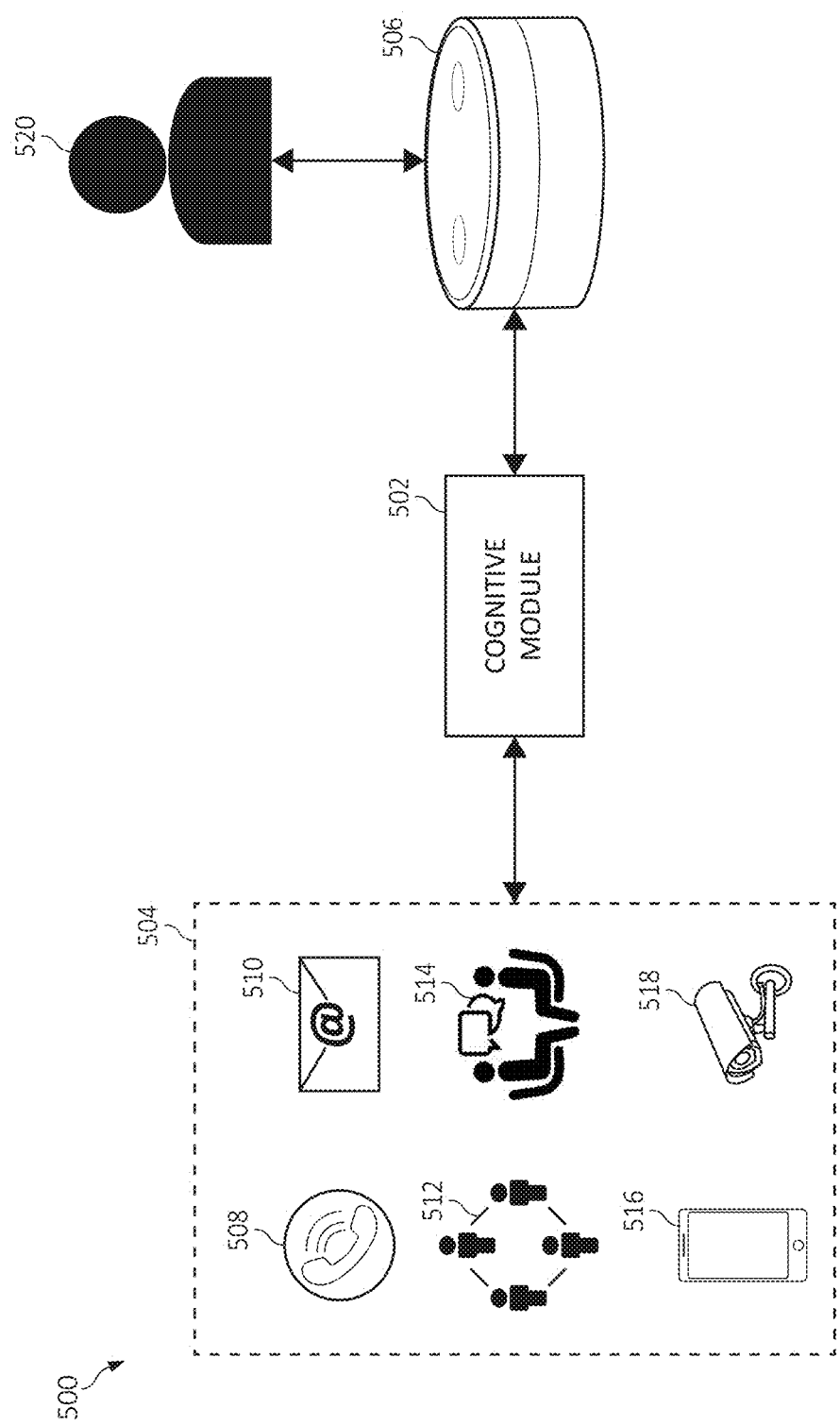
FIG. 5 is a simplified block diagram of a computing environment according to an embodiment of the present invention.

FIG. 5 illustrates an exemplary computing environment (or system) 500 according to some embodiments of the present invention. The environment 500 includes a cognitive module (or control system) 502, data sources 504, and a chatbot device 406. The cognitive module 502 may include (and/or be implemented with) any suitable computing device or system, such as those described above, and may be configured to perform the management of chatbots (or voice response systems), as described herein. The cognitive module 502 may be in operable communication with the data sources 504 and the chatbot device 506. Although the cognitive module 502 is shown as a separate component in FIG. 5, it should be understood that in some embodiments the cognitive module 502 may be integrated into another computing device (e.g., the chatbot device 502, a mobile electronic device, etc.).

The data sources 504 may include multiple data sources that are associated with a user. In the example shown in FIG. 5, the data sources include telephone conversations 508, email(s) 510, social media activity 512, in-person conversations 514, a mobile electronic device 516, and a sensor (e.g., a camera and/or microphone) 518. As such, the data sources 504 may include particular types of data associated with the user (e.g., emails, social media posts, etc.) and/or devices that may be utilized to collect or monitor data associated with the user. It should be understood that the data sources 508-518 shown in FIG. 4 are merely intended as examples, and other/additional data sources may be utilized in some embodiments, such as those described above (e.g., medical records, GPS data, etc.).

The chatbot device 404 may be any suitable computing node through which a user may interact with a chatbot (or voice response system), such as a stand alone/dedicated chatbot device, a mobile electronic device (e.g., a mobile phone, tablet device, laptop computer, etc.), a desktop PC, a vehicular computing system, etc. The chatbot device 404 may be able to receive or detect communications from a user 520 via, for example, a microphone (e.g., voice communications) and/or a keyboard (e.g., text-based communications).

Still referring to FIG. 5, in some embodiments, when the user 520 provides a communication (e.g., a voice communication) to the chatbot device 520, the cognitive module 502 may analyze the received communication and utilize the data sources 504 (and/or any other available data sources associated with the user 504, such as those described above) to, for example, determine a response. The determined response may include generating an auditory response (e.g., via a speaker on the chatbot device 506 and/or another computing device or IoT device) and/or causing an action to be performed (e.g., by another computing device or IoT device), as described above. Feedback provided by the user (e.g., via detecting/monitoring the user's 520 behavior/actions and/or explicit feedback provided in response to queries) may be used to improve the performance of the system over time (e.g., with respect to the same user or other users).

Figure 6:
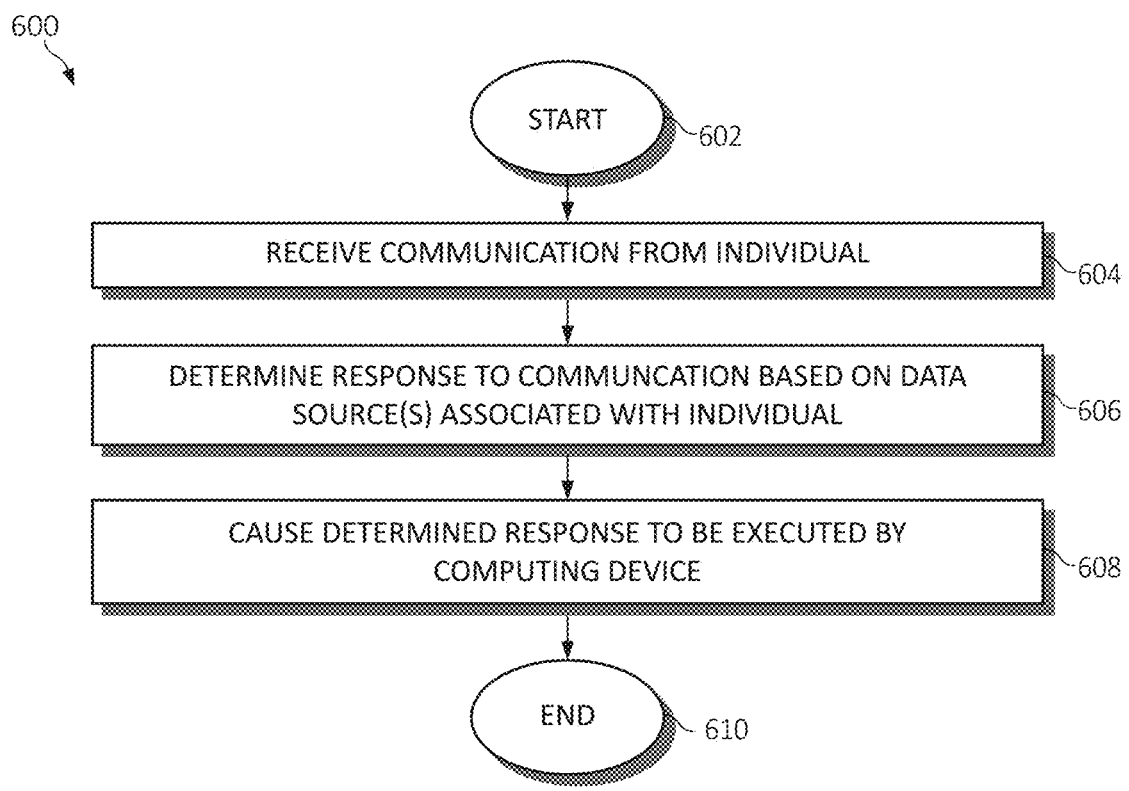
FIG. 6 is a flowchart diagram of an exemplary method for managing voice response systems according to an embodiment of the present invention.

Turning to FIG. 6, a flowchart diagram of an exemplary method 600 for managing (or controlling) chatbots (or voice response systems) (and/or the operation thereof), in accordance with various aspects of the present invention, is provided. Method 600 begins (step 602) with, for example, a chatbot being installed (or otherwise implemented) on or through a computing system/device/node, such as a mobile electronic device (e.g., a mobile phone, tablet device, dedicated chatbot device, etc.).

A communication is received from an individual (or user) (step 604). The communication may be a voice communication or a text-based communication and be in the form of a statement, assertion, question, or command. In embodiments in which the communication is a voice communication, the communication may be detected (or received) by a microphone (e.g., on and/or utilized by a mobile electronic device, dedicated chatbot device, etc.).

A response to the received communication is determined based on at least one data source associated with the individual (or other individual(s)) (step 606). The determined response may include an auditory response and/or an action performed by a computing device (and/or an IoT device). The determining of the response to the received communication may be performed utilizing a cognitive analysis. The at least one data source associated with the individual may include, for example, at least one of electronic communications, social media activity, and a schedule (and/or any of the other possible data sources described above). The at least one data source may include data collected by at least one sensor (e.g., a camera, microphone, etc.).

The determined response is caused to be executed by a computing device (step 608). In some embodiments, the causing of the determined response to be executed by the computing device may include causing an auditory response to be rendered by a speaker (e.g., integrated within and/or utilized by a chatbot device or other computing device) and/or causing an action to be performed by a computing device and/or an IoT device (e.g., playing music, placing an order online, changing a setting/operational state of an IoT device, etc.).

Method 600 ends (step 610) with, for example, feedback being received (and/or detected) from the individual after the determined response is executed. A second communication may be received from the individual. A second response to the second communication may be determined based on the at least one data source associated with the individual and the received feedback. As such, the feedback may be utilized to determine responses to subsequent received communications to improve performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a voice response system comprising:
   receiving a communication from an individual, wherein the communication comprises a declaration articulated by the individual formulated as a self-expression not associated with a particular query nor command;
   determining a response to the received communication based on at least one data source associated with the individual, wherein determining the response is based on an intent of the declaration and a contextual condition of the individual according to a cognitive state of the individual, temporal data, and geospatial metrics, notwithstanding whether the contextual condition is derived from an explicit user input from the individual; and
   causing the determined response to be executed by a computing device, wherein the determined response includes an auditory response and at least one action, and the causing of the determined response to be executed by the computing device includes causing the auditory response to be rendered by a speaker and causing the at least one action to be performed by the computing device, and wherein the auditory response for the intent of the declaration remains unchanged from a previous response for the intent notwithstanding the at least one action to be performed changes from the previous response according to changes in the contextual condition.

2. The method of claim 1, wherein the determining of the response to the received communication is performed utilizing a cognitive analysis.

3. The method of claim 1, wherein the at least one data source associated with the individual includes at least one of electronic communications, social media activity, and a schedule.

4. The method of claim 1, wherein the at least one data source includes data collected by at least one sensor.

5. The method of claim 1, further comprising:
   receiving feedback from the individual after the causing of the determined response to be executed by the computing device;
   receiving a second communication from the individual; and
   determining a second response to the second communication based on the at least one data source associated with the individual and the received feedback.

6. A system for managing a voice response system comprising:
   at least one processor that
      receives a communication from an individual, wherein the communication comprises a declaration articulated by the individual formulated as a self-expression not associated with a particular query nor command;
      determines a response to the received communication based on at least one data source associated with the individual, wherein determining the response is based on an intent of the declaration and a contextual condition of the individual according to a cognitive state of the individual, temporal data, and geospatial metrics, notwithstanding whether the contextual condition is derived from an explicit user input from the individual; and
      causes the determined response to be executed by a computing device, wherein the determined response includes an auditory response and at least one action, and the causing of the determined response to be executed by the computing device includes causing the auditory response to be rendered by a speaker and causing the at least one action to be performed by the computing device, and wherein the auditory response for the intent of the declaration remains unchanged from a previous response for the intent notwithstanding the at least one action to be performed changes from the previous response according to changes in the contextual condition.

7. The system of claim 6, wherein the determining of the response to the received communication is performed utilizing a cognitive analysis.

8. The system of claim 6, wherein the at least one data source associated with the individual includes at least one of electronic communications, social media activity, and a schedule.

9. The system of claim 6, wherein the at least one data source includes data collected by at least one sensor.

10. The system of claim 6, wherein the at least one processor further:

receives feedback from the individual after the causing of the determined response to be executed by the computing device;

receives a second communication from the individual; and determines a second response to the second communication based on the at least one data source associated with the individual and the received feedback.

11. A computer program product for managing a voice response system by one or more processors, the computer program product comprising a non-transitory computer-readable storage medium having computer-readable program code portions stored therein, the computer-readable program code portions comprising:

an executable portion that receives a communication from an individual, wherein the communication comprises a declaration articulated by the individual formulated as a self-expression not associated with a particular query nor command;

an executable portion that determines a response to the received communication based on at least one data source associated with the individual, wherein determining the response is based on an intent of the declaration and a contextual condition of the individual according to a cognitive state of the individual, temporal data, and geospatial metrics, notwithstanding whether the contextual condition is derived from an explicit user input from the individual; and an executable portion that causes the determined response to be executed by a computing device, wherein the determined response includes an auditory response and at least one action, and the causing of the determined response to be executed by the computing device includes causing the auditory response to be rendered by a speaker and causing the at least one action to be performed by the computing device, and wherein the auditory response for the intent of the declaration remains unchanged from a previous response for the intent notwithstanding the at least one action to be performed changes from the previous response according to changes in the contextual condition.

12. The computer program product of claim 11, wherein the determining of the response to the received communication is performed utilizing a cognitive analysis.

13. The computer program product of claim 11, wherein the at least one data source associated with the individual includes at least one of electronic communications, social media activity, and a schedule.

14. The computer program product of claim 11, wherein the at least one data source includes data collected by at least one sensor.

15. The computer program product of claim 11, wherein the computer-readable program code portions further include:

an executable portion that receives feedback from the individual after the causing of the determined response to be executed by the computing device;

an executable portion that receives a second communication from the individual; and an executable portion that determines a second response to the second communication based on the at least one data source associated with the individual and the received feedback.

\* \* \* \* \*